United States Patent [19]

Ehret et al.

[11] Patent Number: 4,459,533
[45] Date of Patent: Jul. 10, 1984

[54] VARIABLE SLIP DRIVE SYSTEM FOR INDUCTION MOTOR

[75] Inventors: Robert J. Ehret, Los Altos; Herschel E. Wright, Santa Clara, both of Calif.

[73] Assignee: Beckman Instruments, Inc., Fullerton, Calif.

[21] Appl. No.: 500,652

[22] Filed: Jun. 3, 1983

[51] Int. Cl.³ .............................................. H02P 5/40
[52] U.S. Cl. .................................... 318/800; 318/314; 318/807
[58] Field of Search ................. 318/799, 800, 807, 314

[56] References Cited

U.S. PATENT DOCUMENTS 4,286,203 8/1981 Ehret .................................... 318/801

OTHER PUBLICATIONS

Dewaan et al., "Slip Speed Control in an Induction Motor with a Phase Reduced Loop," Conference Industry Applications Society IEEE-IAS Annual Meeting, Cleveland, OH, U.S.A., (Sep. 30-Oct. 4, 1979), pp. 952-955.

Primary Examiner—David Smith, Jr.
Attorney, Agent, or Firm—R. J. Steinmeyer; F. L. Mehlhoff; A. A. Canzoneri

[57] ABSTRACT

A variable slip drive system for driving a variable speed induction motor. The system includes a tachometer for providing a signal proportional to the speed of the motor and a slip oscillator. The output of the tachometer and slip oscillator are combined by a motor drive oscillator to provide a motor drive signal. The frequency of the motor drive signal equals the tachometer signal, less the frequency of the slip signal. The motor drive signal is converted into a proportional, three-phase, high power signal for powering the motor. The frequency of the slip signal is controlled so as to be proportional to the motor speed as a means of optimizing the motor's performance.

2 Claims, 1 Drawing Figure

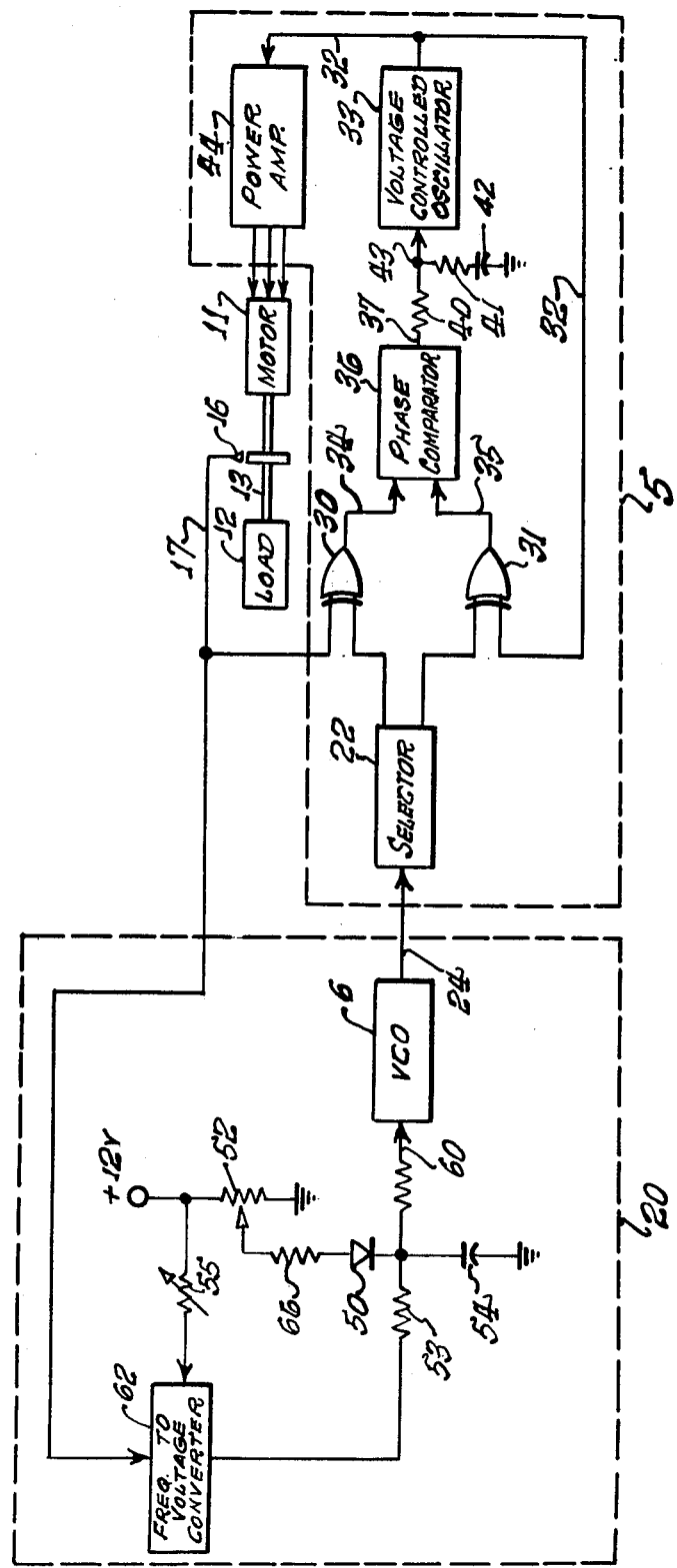

VARIABLE SLIP DRIVE SYSTEM FOR INDUCTION MOTOR

BACKGROUND OF THE INVENTION

The present invention relates to circuitry for supplying a signal for driving an induction motor. More specifically, the invention relates to circuitry for controlling the slip frequency of the motor.

An induction motor is always powered by an alternating current drive signal. The rotational frequency (i.e. speed) of the motor is roughly proportional to the frequency of the alternating current drive signal. When the motor is accelerating, its rotational frequency is less than the frequency of the drive signal. The difference between these two frequencies is defined as the slip frequency.

It is well known that by controlling the slip frequency, the power consumption and output torque of a motor can be controlled. The prior art, in some instances, has made control of the slip frequency manually adjustable. The most common approach, however, is to regulate the slip frequency electronically, to maintain a predetermined constant value. Usually, this is accomplished by providing circuitry to sense the motor speed and maintain a fixed slip frequency drive signal in relation thereto.

A prior art slip frequency control is exemplified in U.S. Pat. No. 4,286,203 to Robert J. Ehret, assigned to Beckman Instruments, Inc., the assignee of the present invention. Other relevant prior art includes U.S. Pat. Nos. 4,042,862 to Franklin; 3,983,463 to Nabae et al.; 3,753,064 to Agarwal et al.; 3,731,169 to Burgholte et al. and 3,568,022 to Domann et al.

A disadvantage of the constant slip frequency systems is that the optimum slip frequency for obtaining a desired motor characteristic, such as for example, maximum torque is a function of the motor's rotational frequency. In particular, at low motor speeds, such as when a motor is accelerating from rest, the slip frequency provided by a constant slip frequency system is usually too high. As a result, the torque of the motor is reduced and the time required to accelerate to the desired operating speed is prolonged.

In one of the aforementioned references, U.S. Pat. No. 3,983,463 to Nabae et al., a system is disclosed wherein motor slip frequency is controlled as a function of the current drawn by the motor. While this technique may offer some advancement over the prior practice, it has the disadvantage of being overly complex and therefore impractical.

SUMMARY OF THE INVENTION

The present invention provides a variable slip drive system for driving a variable speed induction motor. The drive system includes a tachometer for providing a signal whose frequency is proportional to the rotational frequency of the motor, and a slip oscillator. The tachometer and the slip oscillator are both connected to a motor drive oscillator which provides a motor drive signal having a frequency differing from the tachometer signal by an amount equal to the frequency of the slip signal. Means are provided for supplying electrical power to the motor at a frequency proportional to the motor drive signal. The slip oscillator includes means for controlling the frequency of the slip signal so that it is proportional to the frequency of the tachometer signal. This arrangement optimizes the motor's performance throughout its speed range.

BRIEF DESCRIPTION OF THE DRAWING

The solitary FIGURE is an electrical schematic diagram of the preferred embodiment of the invention.

DETAILED DESCRIPTION

The variable slip motor drive system of the present invention with certain exceptions, such as will be noted, bears substantial similarity to an earlier constant slip frequency drive system described in the previously noted U.S. Pat. No. 4,286,203. Primarily, the present invention differs from the earlier drive system in the construction of the slip oscillator, which will be described elsewhere hereinafter.

Referring to the solitary FIGURE, it will be seen that the electrical signal driving motor 11 originates in a motor drive oscillator circuit 5, enclosed in dashed lines in the right-hand side of the FIGURE. Included in the motor drive oscillator circuit 5 are selector 22, X-OR (exclusive-OR) gates 30 and 31, phase comparator 36, resistors 40 and 41, capacitor 42, a first voltage controlled oscillator 33 and power amplifier 44. The voltage controlled oscillator 33 produces a motor drive signal 32 which is converted by the power amplifier 44 into a three-phase high power signal whose frequency is proportional to that of the drive signal 32. This three-phase signal serves to power the induction motor 11.

The rotation of the motor 11 is sensed by the tachometer 16 which produces a tachometer signal 17 in the form of a pulse train whose frequency is proportional to the rotational frequency (i.e. speed) of the motor 11.

The drive system consists also of a slip oscillator 20 which includes a second voltage-controlled oscillator 6 and a frequency-to-voltage converter 62. The slip oscillator 20 produces a slip signal 24 in the form of a pulse train whose frequency is proportional to the desired slip frequency of the motor 11. The operation of the slip oscillator 20 will be further described hereinafter.

Regulation of the motor's slip frequency is accomplished by using a feedback control circuit within the motor drive oscillator circuit 5. This feedback control circuit includes first and second X-OR gates 30 and 31 connected to receive the tachometer signal 17 and the motor drive signal 32 respectively. Depending on whether the motor is to be operated in the "acceleration mode" or "deceleration mode," the demultiplexer or "selector" 22 connects the slip signal 24 to the second input of one of the two X-OR gates 30 and 31. (The selector 22 is a solid state, digitally controlled analog switch of a common commercial type such as RCA Type CD4053B.)

In the acceleration mode, the selector 22 connects the slip signal 24 to the first X-OR gate 30. In this mode, the output of the first gate 30 is a signal 34 whose frequency is the sum of the frequencies of the tachometer signal 17 and the slip signal 24. The output 35 of the second gate 31 is the same as the motor drive signal 32. A frequency comparator or phase comparator 36 compares the frequencies of the output signals 34 and 35 from the two gates 30 and 31 and supplies an error signal 37 whose value indicates which of the two frequencies is greater.

The error signal 37 is applied to the first voltage-controlled oscillator 33, which in response thereto increases or decreases the frequency of the drive signal 32 so as to minimize the difference between the frequencies of the two gate outputs 34 and 35. As a result of this feedback and error-correction process, the frequency of the drive signal 32 is maintained at a value equal to the sum of the frequencies of the tachometer signal 17 and the slip signal 24.

In the deceleration mode, the selector 22 connects the slip signal 24 to the second X-OR gate 31. In this mode, the output of the second gate 31 is a signal 35, whose frequency is the sum of the frequencies of the motor drive signal 32 and the slip signal 24. The output 34 of the first gate 30 is the same as the tachometer signal 17. The remaining circuit elements operate in the same manner as in the acceleration mode, previously described. Accordingly, in the deceleration mode, the frequency of the drive signal 32 is maintained at a value equal to the frequency of the tachometer signal 17 minus the frequency of the slip signal 24.

The foregoing description refers to the portion of the drive system which drives the motor 11, wherein the motor's slip frequency is proportional to the slip signal 24 produced by the slip oscillator 20. The operation of the slip oscillator 20 will now be described in detail.

In addition to the earlier-described second voltage-controlled oscillator 6, the slip oscillator 20 includes a frequency-to-voltage (F/V) converter 62 which receives the tachometer signal 17 and produces an output voltage proportional thereto. The F/V converter 62 preferably includes a variable resistor 55 for manually adjusting the slope of the F/V transfer characteristic. The output voltage of the F/V converter 62 is preferably smoothed by a low-pass filter comprising resistor 53 and capacitor 54. The output is then added to the voltage from the manually adjustable potentiometer 52 through resistor 66 and diode 50 and applied to the control input 60 of the voltage-controlled oscillator 6.

Since the voltage-controlled oscillator 6 produces the slip signal 24 at a frequency proportional to the voltage at the control input 60, and this voltage is proportional to the frequency of the tachometer signal 17, the slip oscillator circuit 20 causes the motor slip frequency to be proportional to the motor speed, which is the desired result.

The potentiometer 52 and variable resistor 55 may be adjusted to vary the motor slip frequency versus motor speed characterstic as a function of the specific type of motor used, the inertia of the load to be moved and any other factors having relevance to the operation of the motor. For example, by adjusting the fixed offset component of control voltage 60 (via variable resistor 55), potentiometer 52 can be used to control the slip frequency at near-zero motor speed. Variable resistor 55 can then be used to control the rate at which the slip frequency increases with increasing motor speed. To restate briefly, variable resistor 55 allows adjustment of the output of the F/V converter, which changes the scale factor of the slip frequency as a function of speed. And finally, the potentiometer 25 can be adjusted to add a voltage to the control input 60 and thereby set a minimum value of slip at near-zero speed. Accordingly, by the means which have been described, the circuit of the invention provides optimum motor acceleration over a wide range of speed while at the same time providing optimum output torque.

While in accordance with the patent statutes there has been described what at present is considered to be the preferred embodiment of the invention, it will be understood by those skilled in the art that various changes and modifications may be made therein without departing from the invention and it is, therefore, the aim of the appended claims to cover all such changes and modifications as fall within the true spirit and scope of the invention.

We claim:

1. A variable slip drive system for an induction motor, comprising:
    a tachometer for providing a signal whose frequency is proportional to the rotational frequency of said motor;
    a slip oscillator providing a slip signal characterized by a frequency of oscillation;
    a motor drive oscillator connected to said tachometer and said slip oscillator providing a motor drive signal having a frequency differing from the frequency of said tachometer signal by an amount equal to the frequency of said slip signal;
    means for supplying electrical power to said motor at a frequency proportional to the frequency of said motor drive signal; and
    said slip oscillator including means for controlling the frequency of said slip signal so that it is proportional to the frequency of said tachometer signal.

2. The drive system defined in claim 1 wherein said slip oscillator comprises:
    a frequency-to-voltage converter connected to said tachometer for providing a control voltage proportional to the frequency of said tachometer signal; and
    a voltage-controlled oscillator connected to said frequency-to-voltage converter for providing said slip signal having a frequency proportional to said control voltage.

* * * * *